United States Patent [19]
Pirklbauer et al.

[11] Patent Number: 5,167,699
[45] Date of Patent: Dec. 1, 1992

[54] PROCESS AND INSTALLATION FOR PRODUCING MOLTEN STEEL OF SCRAP

[75] Inventors: Wilfried Pirklbauer, Schmidberg; Alfred Weber, St. Georgen, both of Austria

[73] Assignee: Voest-Alpine Industrieanlagenbau G.m.b.H., Linz, Austria

[21] Appl. No.: 772,458

[22] Filed: Oct. 7, 1991

[30] Foreign Application Priority Data

Oct. 16, 1990 [AT] Austria ................................. 2086/90

[51] Int. Cl.⁵ .......................... C22B 1/248; C22B 4/00
[52] U.S. Cl. ...................................... 75/581; 75/10.53
[58] Field of Search ............................ 75/581, 10.53

[56] References Cited

U.S. PATENT DOCUMENTS 3,529,067  9/1970  Grott ......................................... 75/581
3,645,515  2/1972  Kemmetmueller ........................ 263/32

FOREIGN PATENT DOCUMENTS 2064743  6/1981  United Kingdom .
2166723  5/1986  United Kingdom .

*Primary Examiner*—Peter D. Rosenberg
*Attorney, Agent, or Firm*—Hopgood, Calimafde, Kalil, Blaustein & Judlowe

[57] ABSTRACT

There is disclosed a process for the production of molten steel or steel pre-products from scrap contaminated with combustible waste-like substances and heated and melted in a metallurgical meltdown vessel. In order to be able to dispose of the forming noxious substances at low costs and to keep the offgases free of impurities detrimental to the environment, the gas forming during charging of scrap into the metallurgical vessel and during heating and melting of the scrap, after conditioning to a temperature range of between 1000° and 1500° C., is used as a heating gas in a lime-burning process including a moving lime fixed-bed under release of its sensible heat. Sulfur- and chlorine-containing components of the heating gas are absorbed on the burnt lime and the dust contained in the heating gas is separated in the lime fixed-bed. The heating gas, which is purified and cooled at its passage through the lime fixed-bed, subsequently is finally purified in a filtering plant.

15 Claims, 1 Drawing Sheet

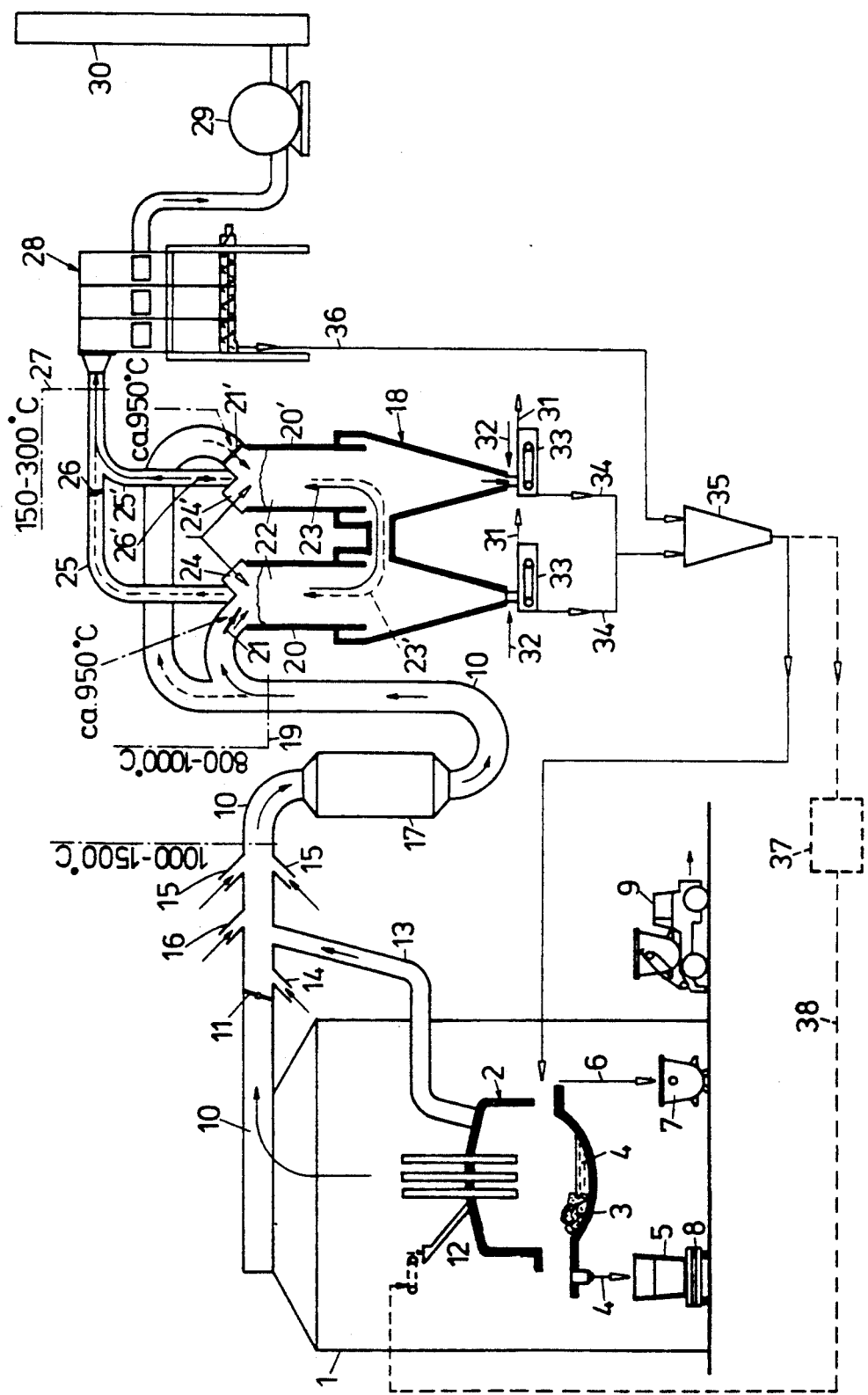

PROCESS AND INSTALLATION FOR PRODUCING MOLTEN STEEL OF SCRAP

The invention relates to a process for the production of molten steel or steel pre-products from scrap contaminated with combustible waste-like substances and, if desired, from liquid charging substances, in particular motorcar scrap, which scrap is heated and melted in a metallurgical meltdown vessel, as well as to an installation for carrying out this process.

BACKGROUND OF THE INVENTION

The processing of scrap incurred by dismounting or destroying already used objects and appliances, e.g., consumer scrap, constitutes a problem in the steel industry.

Consumer scrap, in particular motorcar scrap, is characterized by a high portion of organic impurities, such as combustible waste-like substances in solid or liquid forms, as well as nonferrous metallic accompanying substances and, therefore, can be processed at high expenditures only. At present, scrap usually is melted in electric arc furnaces, cupola and blast furnace hearths and in oxygen converters. However, for low-quality consumer scrap, only cupolas and blast furnaces are suitable.

A particular problem arises on account of the organic admixtures in the form of synthetic materials, which, upon heating, release offgases that are harmful to the environment and to health, containing dioxine, furan and higher hydrocarbons. Another problem is caused by the impurities, such as sulfur, which also constitutes a load on the environment together with the offgases.

A further problem is to be seen in that solid or liquid waste products formed by the meltdown process incur, part of which can be utilized only with difficulty or not at all such that they must be dumped anyway. Sulfur and chlorine-containing products constitute special waste, thus involving accordingly higher costs for dumping.

OBJECT OF THE INVENTION

It is the object of the invention to avoid these disadvantages and difficulties and to provide a process and an arrangement for carrying out the process, by which the disposal of the noxious substances is feasible at low costs without creating additional dumping products and the offgases forming are free of impurities detrimental to the environment.

SUMMARY OF THE INVENTION

In accordance with the invention, this object is achieved in that the gas forming during charging of the scrap into the metallurgical meltdown vessel and during heating and melting of the scrap, after conditioning to a temperature range of between 1000° and 1500° C., is used as a heating gas in a lime-burning process with a moving lime fixed-bed under release of its sensible heat, wherein sulfur and chlorine containing components of the heating gas ar absorbed on the burnt lime and the dust contained in the heating ga is separated in the lime fixed-bed and the heating gas, which is purified and cooled at its passage through the lime fixed-bed, subsequently is finally purified in a filtering plant.

The process according to the invention enables the disposal of the noxious substances contained in the offgases at a simultaneously optimum thermal utilization of the same in combination with a plant component, i.e., a lime kiln, which is available at every steelworks anyway, since burnt lime is employed in metallurgical aggregates for the formation of slag.

The PCDD (polychlorinated dibenzodioxines) and PCDF (polychlorinated dibenzofurans) and higher hydrocarbons contained in the offgas forming in scrap melting are decomposed during conditioning of this gas to a temperature range of between 1000° and 1500° C. The heating gas thus purified from these substances, which has a temperature of between 800° and 1000° C. prior to being injected into the moving lime fixed-bed, gives off its sensible heat by avoiding a "de novo synthesis" in the lime fixed-bed such that a decomposition of the charged limestone into $CaO$ and $CO_2$ takes place.

In doing so, the sulfur and chlorine containing components of the offgas (e.g., $SO_2$ and $HCl$) are absorbed by the burnt lime and a highly efficient dust separation is obtained in the moving lime fixed-bed such that the gas is purified from soot, heavy metal aerosols, $FeO$, etc.

Thus, the process according to the invention allows for the optimum disposal of scrap at minimum investment costs, wherein plant components that have long proved successful in practice, such as, e.g., direct current regenerative shaft furnaces, may be used.

Since dioxines and furans already are formed at relatively low temperatures, the offgas forming in the preheating of scrap outside of the metallurgical meltdown vessel suitably is mixed with the gas forming within the metallurgical vessel during melting of the scrap and, together with the same, is used as a heating gas in the lime burning process.

Suitably, the heating gas is homogenized and completely reacted in a mixing chamber upon conditioning to a temperature range of between 1000° and 1500° C.

According to a particularly advantageous embodiment, the dust incurred in the filtering plant, together with the dust and fine lime incurred in the lime burning process, is recycled into the meltdown vessel as a slag former, suitably is blown into the meltdown vessel.

According to another preferred embodiment, the dust is briquetted and the briquets are charged into the meltdown vessel, if desired, commonly with lump lime. If scrap having a high portion of galvanized sheet is used, it may be suitable to supply the briquets formed of the dust to a zinc smelting plant. This is of a particular advantage if the zinc content within the dust amounts to more than 20%.

In order to ensure a perfect gas flow control, the heating gas suitably is sucked off the meltdown vessel by means of an induced draught ventilator following final filtering and is passed through the lime fixed-bed. In this case, the induced draught ventilator is provided on the cold side of the gas flow control such that the investment costs involved will not be too high and a long service life of the induced draught ventilator will be safeguarded.

An installation for carrying out the process of the invention, which comprises a metallurgical meltdown vessel provided with an offgas duct and surrounded by an enclosure including an exhaust duct, is characterized in that the offgas duct runs into the exhaust duct of the enclosure, burners are provided in the exhaust duct and, if desired, an oxygen-containing gas feed enters, that the exhaust duct is provided with a mixing chamber and runs into a lime shaft kiln containing a moving lime fixed-bed, and an exhaust duct leads from the lime shaft kiln to an induced draught ventilator via a filtering plant and, further on, to a stack.

Preferably, the mixing chamber provided in the exhaust duct is formed by a thermoreactor. This thermoreactor includes baffle means in its interior, which urge the gas molecules to constantly changing direction when passing through the thermoreactor. Instead of the thermoreactor a hot gas cyclone may be provided, into which the conditioned ga is injected from various points so as to be intimately blended.

Preferably, a dust evacuation duct each leads from the lime shaft kiln and from the filtering plant to a dust bin, wherein a dust recycling duct suitably leads from the dust bin to the meltdown vessel or, according to another preferred embodiment, a briquetting plant is following the dust bin, from which a conveying means for conveying briquets leads to the meltdown vessel.

THE DRAWING

The invention will be explained in more detail by way of an exemplary embodiment represented in the accompanying drawing, which is a schematic illustration of an installation for realizing the process according to the invention.

DETAILS OF THE INVENTION

An electric melting furnace 2, which is charged with pre-heated scrap 3, is provided in an enclosure 1 closed on all sides. The liquid steel 4, or the liquid steel pre-product, formed of the molten scrap is poured into a steel casting ladle 5. The slag 6 is collected in a slag bucket 7. The enclosure 1 comprises closeable doors (not illustrated) for charging the scrap 3 and moving in and out the steel casting ladle 5 arranged on a transport car 8 and for removing the slag bucket 7 by means of a slag bucket transport vehicle 9.

On its ceiling, the enclosure 1 is provided with an exhaust duct 10 closeable by a flap 11. From the lid 12 of the meltdown vessel 2, an offgas duct 13 leads into the exhaust duct 10 of the enclosure 1. Furthermore, an offgas duct 14 conveying offgases from an optionally provided scrap pre-heating means runs into the exhaust duct.

Within the exhaust duct 10 burners 15 and gas feeds 16 are provided after the entry of the offgas ducts 13 and 14, for feeding pure oxygen or oxygen-containing gas, by aid of which the temperature of the offgases may be conditioned to 1000° to 1500° C., preferably 1200° to 1500° C. The exhaust duct 10 runs into a thermoreactor 17, in which the offgases are blended in order to achieve a complete combustion and to obtain the complete reaction of the gas components. In its interior, the thermoreactor comprises baffle plates of high-temperature steel (not illustrated), which baffle plates urge the gas to frequent changes of direction and, thus, to good mingling.

After the thermoreactor 17, a two-shaft regenerative lime kiln 18 follows, wherein the offgas supplied via exhaust duct 10 and, if desired, having been subjected to additional conditioning to a temperature ranging between 800° and 1000° C. at 19 after the thermoreactor 17, is introduced as a heating gas once into one shaft 20 and once into the other shaft 20' of the two-shaft regenerative lime kiln 18 and (according to the position of the flaps 21, 21') streams through the fixed bed 22 composed of charged limestone in the direction of arrows 23 and 23', respectively. Each shaft 20, 20' of the lime kiln 18 has its own charging opening 24, 24' for the limestone and its own exhaust duct 25, 25' for offgases forming within the lime kiln 18.

The exhaust ducts 25, 25', which are facultatively lockable by means of flaps 26, 26', enter a filtering plant 28 for final purification, if desired, upon conditioning (at 27) for adjustment of the offgas emerging from the lime kiln at a temperature of between 150° and 750° C. to a temperature range of between 150° and 300° C. by $H_{2O}$ injection. From the filtering plant 28, the purified offgas is conveyed to a stack 30 by means of an induced draught ventilator 29.

The choice of filtering plant 28 is largely dependent on the lime production rate, since a possible condensate formation at low pure-gas temperatures is to be taken into account. For instance, if an E-filter is used instead of a pulsed jet filter, the separation of condensate practically is improbable due to the higher temperature of entry into the filtering plant.

After having been passed through by cooling air 32, the lime 31 is discharged from the lime kiln 18 on the lower end of each shaft 20, 20' of the lime kiln 18, the fine lime 34 formed by abrasion being separated by means of a consecutively arranged sieving means 33 together with the dust filtered off the offgas and intermediately stored in a dust bin 35. In addition, the dust 36 separated in the filtering plant 28 is introduced into the bin 35. The thus burnt lime, in principial, may be used with all metallurgical aggregates (e.g., in E-furnaces, KVA scrap smelting reactors, LD crucibles, EOF, etc.) for slag formation.

The dust collected within the dust bin 35 either is blown into the meltdown vessel 2 or is briquetted in a briquetting plant 37, the briquets being admixed to the charging stock commonly with the lump lime, as is illustrated by broken line 38. If the dust has a high content of zinc (more than 20%), it preferably is delivered to a zinc works.

In the following, the smelting of scrap is explained in more detail by way of an exemplary embodiment:

The following scrap grade was charged into the melting vessel 2:

25% car packages (65% Fe, 30% combustible waste-like substances)

35% lumpy scrap (98% Fe, 1% combustible waste-like substances)

25% heavy scrap (95% Fe, 3% combustible waste-like substances)

15% chips (90% Fe, 5% combustible waste-like substances.

The offgas emerging from the melting vessel 2 had a temperature of between 800° and 1000° C. (when using a KVA vessel instead of the electric melting vessel 2, this temperature is lower on account of the higher scrap column provided in the KVA vessel, amounting to 400° to 600° C).

After conditioning of the offgas emerging from the melting vessel 2, to a temperature of 1400° C. by injecting oxygen-containing gas, the offgas had the following analysis:

11% $CO_2$, 17% $H_2O$, 66% $N_2$,
5% $O_2$, 0.083% $SO_2$, 0.118% HCl.

The offgas incurred in an amount of 780 standard-$m^3$/t crude steel and per standard-$m^3$ contained dust in an amount of 16 g having the following analysis:

30% ZnO, 20% CaO, 14% $Na_2O$, 10% $SiO_2$, 6% $Fe_2O_3$,
3% PbO, 3% $K_2O$, 2% MnO, 2% MgO, 2% CuO,
1% $Cr_2O_3$, 1% $Al_2O_3$, balance 6%.

The pure gas discharged through the stack 30 incurred in an amount of 1,100 standard-m$^3$/t crude steel and had the following analysis:

19% $CO_2$, 30% $H_2O$, 46% $N_2$, 4% $O_2$, less than 0.001% $SO_2$ and HCl.

The content of dioxines, furans and higher hydrocarbons was below the detectable limit. In the pure gas, less than 5 mg dust per standard m$^3$ were present. The lime production amounted to 320 kg CaO/t crude steel.

What we claim is:

1. A process for the production of molten steel or steel pre-products from scrap contaminated with combustile gas-forming waste substances which comprises:
   providing a metallurgical meltdown vessel,
   preheating and charging said contaminated scrap into said meltdown vessel during the preheating of which a first offgas is formed,
   further heating and melting said charged scrap during which a second offgas is formed,
   combining said first and second offgases,
   conditioning said combined first and second offgases to a temperature in the range of about 1000° C. to 1500° C.,
   directing said combined and heated first and second offgases as a heating gas to and through a lime kiln to convert lime therein to burnt lime, wherein any sulfur and chlorine contained in said heating gas are absorbed by said burnt lime and dust contained in said heating gas is separate during passage of said heating gas through said kiln, following which a pre-purified and cooled gas is obtained, and
   then further purifying said pre-purified and cooled heating gas by passing it through a filtering plant.

2. A process as set forth in claim 1, further comprising pre-heating said scrap outside of said metallurgical meltdown vessel under formation of offgas, mixing said offgas with said gas forming during melting, and using said offgas commonly with said gas forming during melting as a heating gas in said lime burning process.

3. A process as set forth in claim 1, further comprising homogenizing and completely reacting said heating gas after conditioning to a temperature range of between 1000° and 1500° C. in a mixing chamber.

4. A process as set forth in claim 1, wherein dust incurred in said filtering plant, commonly with dust incurred in said lime burning process and including fine lime, is recycled into said meltdown vessel as a slag-former.

5. A process as set forth in claim 4, wherein said dust is blown into said meltdown vessel.

6. A process as set forth in claim 4, further comprising briquetting said dust so as to obtain briquets and charging said briquets into said meltdown vessel.

7. A process as set forth in claim 6, wherein said briquets are charged into said meltdown vessel commonly with lump line.

8. A process as set forth in claim 1, wherein an induction draught ventilator is provided to follow said final filtering for sucking off said heating gas from said meltdown vessel and moving it through said lime fixed-bed.

9. In an installation for producing molten steel or steel pre-products from scrap contaminated with combustible gas-forming substances, said installation including a metallurgical meltdown vessel provided with an offgas duct for conducting offgases formed during charging and melting of scrap in said vessel, said vessel being surrounded by an enclosure having an exhaust duct connected thereto, the improvement;
   wherein said offgas duct of said metallurgical meltdown vessel extends into said exhaust duct of said enclosure and further comprising:
   burners provided in said exhaust duct,
   a mixing chamber connected forwardly of said exhaust duct for receiving said offgases,
   a lime shaft kiln connected to said exhaust duct forwardly of said mixing chamber and containing a moving lime fixed bed,
   a further exhaust duct extending from said lime kiln to a filtering plant,
   an induced draft ventilator connected forwardly of said filtering plant to draw said treated offgases through said filtering plant, and
   a stack connected forwardly of said draft ventilator for disposing of treated gas therethrough.

10. An installation as set forth in claim 9, further comprising an oxygen-containing gas feeding duct entering said exhaust duct.

11. An installation as set forth in claim 9, wherein said mixing chamber provided in said exhaust duct is comprised of a thermoreactor.

12. An installation as set forth in claim 9, wherein said mixing chamber provided in said exhaust duct is comprised of a hot-gas cyclone.

13. An installation as set forth in claim 9, further comprising a dust bin and dust evacuation duct means leading from said lime shaft kiln and from said filtering plant to said dust bin.

14. An installation as set forth in claim 13, further comprising a dust recycling duct leading from said dust bin to said meltdown vessel.

15. An installation as set forth in claim 13, further comprising a briquetting plant arranged after said dust bin and a briquet-conveying means leading from said briquetting plant to said meltdown vessel.

* * * * *